(12) United States Patent
Kim et al.

(10) Patent No.: US 10,527,764 B2
(45) Date of Patent: Jan. 7, 2020

(54) INFRARED CUT FILTER, CAMERA MODULE HAVING THE FILTER, AND ELECTRONIC DEVICE HAVING THE MODULE

(71) Applicant: Samsung Electronics Co., Ltd., Suwon-si, Gyeonggi-do (KR)

(72) Inventors: Sungwon Kim, Yongin-si (KR); Byungkwon Kang, Suwon-si (KR); Moonjoon Kim, Hwaseong-si (KR); Jiyoon Park, Yongin-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 231 days.

(21) Appl. No.: 15/663,622

(22) Filed: Jul. 28, 2017

(65) Prior Publication Data
US 2018/0031745 A1 Feb. 1, 2018

(30) Foreign Application Priority Data
Jul. 29, 2016 (KR) .................. 10-2016-0097120

(51) Int. Cl.
*G02B 5/20* (2006.01)
*G02B 1/11* (2015.01)
*G02B 5/02* (2006.01)
*G02B 5/22* (2006.01)
*G02B 5/26* (2006.01)
*G02B 5/28* (2006.01)
*H04N 5/225* (2006.01)

(52) U.S. Cl.
CPC .............. *G02B 5/208* (2013.01); *G02B 1/11* (2013.01); *G02B 5/0284* (2013.01); *G02B 5/22* (2013.01); *G02B 5/26* (2013.01); *G02B 5/281* (2013.01); *H04N 5/225* (2013.01)

(58) Field of Classification Search
CPC ........ G02B 5/208; G02B 5/284; G02B 5/282; G02B 1/115; G02B 5/22; G02B 1/11; G02B 5/281; G02B 5/26; G02B 5/0284; H04N 5/225; H04N 5/2257
USPC ........................................ 250/338.1
See application file for complete search history.

(56) References Cited

U.S. PATENT DOCUMENTS

2013/0147965 A1* 6/2013 Gao .................. G02B 5/282
348/164

FOREIGN PATENT DOCUMENTS

JP 2012137648 A 7/2012
KR 1020120073753 A 7/2012
KR 1020150009764 A 1/2015

* cited by examiner

*Primary Examiner* — David P Porta
*Assistant Examiner* — Meenakshi S Sahu (57) ABSTRACT

An infrared (IR) cut filter includes an absorption type filter, a first coating layer, and a second coating layer. The absorption type filter absorbs IR light of a first wavelength band. The first coating layer is formed on a first side of the absorption type filter and passes visible light and reflects a part of the IR light. The second coating layer is formed on a second side of the absorption type filter and reflects a remaining part of the IR light that passes through the first coating layer and enters the absorption type filter. The absorption type filter further absorbs the IR light of a second wavelength band within the absorption type filter. In addition, a camera module having the IR cut filter is provided and an electronic device having the camera module also is provided.

13 Claims, 9 Drawing Sheets

INFRARED CUT FILTER, CAMERA MODULE HAVING THE FILTER, AND ELECTRONIC DEVICE HAVING THE MODULE

CROSS-REFERENCE TO RELATED APPLICATION AND CLAIM OF PRIORITY

This application is related to and claims priority to Korean Patent Application No. 10-2016-0097120 filed on Jul. 29, 2016, the contents of which are incorporated herein by reference.

TECHNICAL FIELD

The present invention relates to an infrared cut filter, a camera module having the filter, and an electronic device having the module.

BACKGROUND

An electronic device such as a digital camera or a smart phone can acquire an image by using an image sensor that converts light into electric signals through a charge-coupled device (CCD) or a complementary metal-oxide semiconductor (CMOS). Normally, the image sensor detects infrared (IR) light as well as visible light, thus deteriorating the color reproduction rate of an image. Accordingly, the electronic device has an IR cut filter (also referred to as an IR cut-off filter or an IRCF) so as to obtain a clearer image by blocking light in the IR band.

A typical IR cut filter may include a film plate formed to absorb IR light of a specific band and further include reflective coating films coated on both sides of the film plate to reflect IR light. In this IR cut filter, when a light containing a large amount of IR rays enters, a part of IR light is not absorbed into the film plate and repeatedly reflected by the reflective coating films on both sides of the film plate. Unfortunately, such multiple reflections of IR light occurring in the IR cut filter often causes a light-blurring phenomenon in an image obtained from the image sensor.

SUMMARY

To address the above-discussed deficiencies, it is a primary object to provide an advanced IR cut filter, together with a camera module having the IR cut filter and an electronic device having the camera module, which has the ability to suppress multiple reflections of IR light and thus obviate a light-blurring phenomenon in order for clear, high-quality images to be acquired.

According to various embodiments, an infrared (IR) cut filter may include an absorption type filter formed to absorb IR light of a first wavelength band, a first coating layer formed on a first side of the absorption type filter and formed to pass visible light and reflect a part of the IR light, and a second coating layer formed on a second side of the absorption type filter and formed to reflect a remaining part of the IR light that passes through the first coating layer and enters the absorption type filter. In the IR cut filter, the absorption type filter may be formed to further absorb the IR light of a second wavelength band within the absorption type filter.

According to various embodiments, a camera module may include a lens for refracting light incident from an outside or exterior of the camera module, an image sensor for obtaining an image formed by the refracted light, and an infrared (IR) cut filter disposed between the lens and the image sensor. The IR cut filter may include an absorption type filter formed to absorb IR light of a first wavelength band, a first coating layer formed on a first side of the absorption type filter and formed to pass visible light and reflect a part of the IR light, and a second coating layer formed on a second side of the absorption type filter and formed to reflect a remaining part of the IR light that passes through the first coating layer and enters the absorption type filter. The absorption type filter may be formed to further absorb the IR light of a second wavelength band within the absorption type filter.

According to various embodiments, an electronic device may include a camera module, a processor, and a memory. In the electronic device, the camera module may include an infrared (IR) cut filter for absorbing IR light of a first wavelength band and for further absorbing the IR light of a second wavelength band which is narrower than the first wavelength band.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
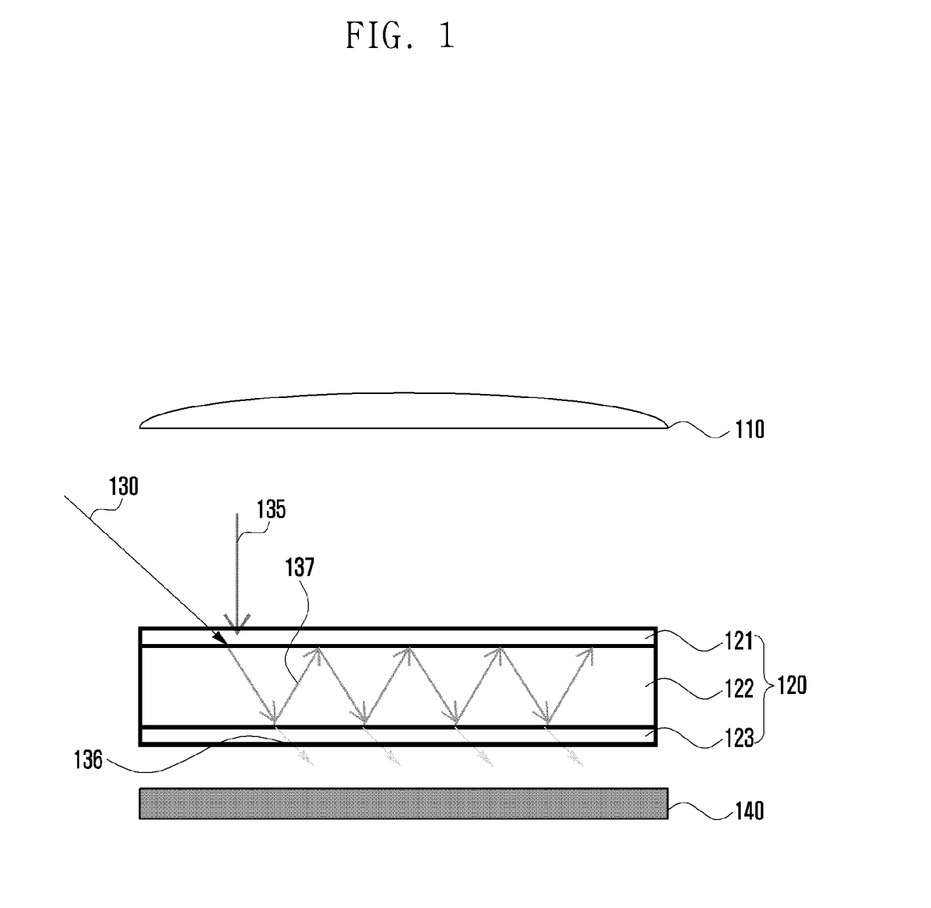
FIG. 1 is a schematic diagram illustrating a multiple reflection phenomenon in a typical IR cut filter.

FIG. 1 is a schematic diagram illustrating a multiple reflection phenomenon due to differences of an incidence angle in a typical IR cut filter.

As shown in FIG. 1, the typical IR cut filter 120 may be disposed between a lens 110 for refracting light and an image sensor 140 for obtaining an image formed by the refracted light.

In one example, the IR cut filter 120 may be a film-based absorption type filter. The IR cut filter 120 may include a film plate 122, a first reflective coating layer 121 deposited on one side of the film plate 122 to face the lens 110, and a second reflective coating layer 123 deposited on the opposite side of the film plate 122 to face the image sensor 140.

In one example, the light incident on the lens 110 passes through the lens 110 and the IR cut filter 120 and reaches the image sensor 140. With regard to the light passing through the lens 110, the IR cut filter 120 passes the light in a visible light band (e.g., having wavelengths from 400 nm to 700 nm) and reflects or absorbs the light in an IR band (e.g., having wavelengths of 750 nm or more).

The light incident on the image sensor 140 has an incident angle which is also referred to as a chief ray angle (CRA). The CRA is equal to an incident angle of the light incident on the IR cut filter 120. Normally, these incident angles may vary from 0 degrees to about 30 degrees. FIG. 1 shows, for example, the light 135 having an incident angle of 0 degrees and the light 130 having an incident angle of 30 degrees.

Meanwhile, because of variation of incident angles, a wavelength shift phenomenon, namely, a change in transmittance (or reflection) characteristics of the IR band, may be caused in the IR cut filter 120. This will be described later with reference to FIG. 2.

In the IR cut filter 120, the first reflective coating layer 121 formed on one side of the film plate 122 and the second reflective coating layer 123 formed on the opposite side of the film plate 122 are each designed to respectively block the IR band by half in consideration of economy and stability. However, actually, there exists a region in which the high reflective bands of the first and second reflective coating layers 121 and 123 are overlapped with each other (hereinafter, this region will be also referred to as a cross region or a cross band). Therefore, among the IR light that enters the film plate 122, the IR light corresponding to the overlapped band of the coating layers 121 and 123 is repeatedly reflected inside the film plate 122, causing problems such as light blurring.

For example, when the light 130 having an incident angle of 30 degrees is incident on the IR cut filter 120, the first reflective coating layer 121 passes the visible light and blocks (i.e., reflects) a part of the IR light. Therefore, the other part of the IR light enters the film plate 122. The visible light that enters the film plate 122 passes through the second reflective coating layer 123 and reaches the image sensor 140. However, since the high reflective bands of the first and second reflective coating layers 121 and 123 are crossed, the IR light 137 that is not absorbed in the film plate 122 is reflected by the second reflective coating layer 123 and then reflected by the first reflective coating layer 121. This phenomenon is referred to as multiple reflections. At this time, a part of the IR light 136 may pass through the second reflective coating layer 123 along the multiple reflection paths and then reach the image sensor 140, thereby causing light blur.

Meanwhile, the first and second reflective coating layers 121 and 123 formed on the film plate 122 cause a wavelength shift depending on differences of the incident angle of the incident light. Now, the wavelength shift phenomenon will be described with reference to FIG. 2.

Figure 2:
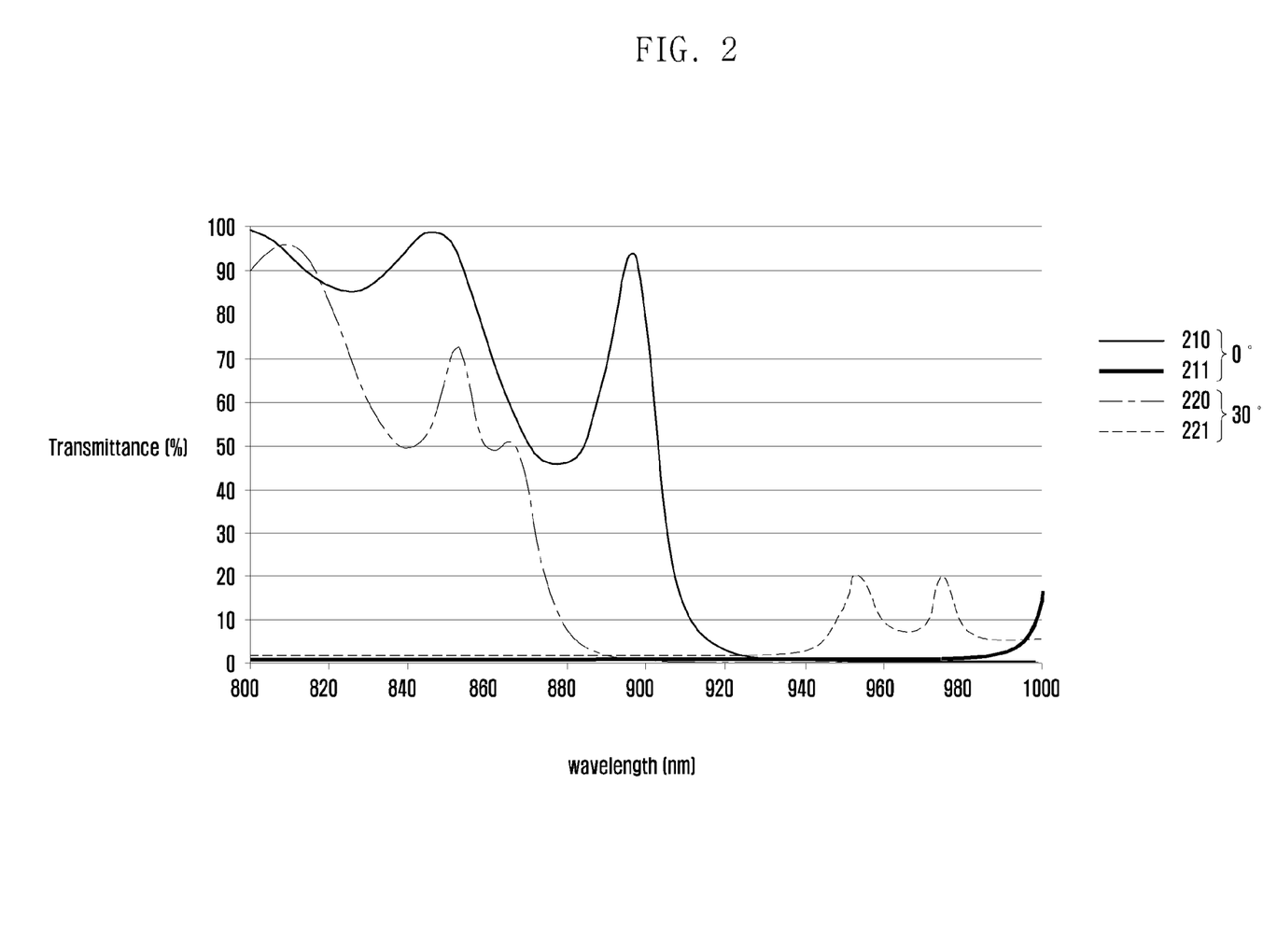
FIG. 2 is a graph illustrating a wavelength shift due to differences in an incidence angle in a typical IR cut filter.

FIG. 2 is a graph illustrating a wavelength shift due to differences in an incidence angle in a typical IR cut filter.

As shown in FIGS. 1 and 2, the coating layers 121 and 123 respectively formed on both sides of the film plate 122 in the IR cut filter 120 may cause a change in transmittance characteristics, namely, a wavelength shift, depending on incident angles of the incident light. In the graph of FIG. 2, the abscissa indicates the IR band having a wavelength from 800 nm to 1000 nm, and the ordinate indicates the transmittance (%). For convenience, only the transmittance of 0-degree incident light 135 and 30-degree incident light 130 is shown in the graph, but such a wavelength shift may also occur in cases when the incident light has other incident angles.

In FIG. 2, a reference numeral 210 denotes the transmittance of the second reflective coating layer 123 with respect to the 0-degree incident light, and a reference numeral 211 denotes the transmittance of the first reflective coating layer 121 with respect to 0-degree incident light. In addition, a reference numeral 220 denotes the transmittance of the second reflective coating layer 123 with respect to the 30-degree incident light, and a reference numeral 221 denotes the transmittance of the first reflective coating layer 121 with respect to the 30-degree incident light.

Although not shown in the graph, each of the first reflective coating layer 121, the film plate 122, and the second reflective coating layer 123 has the transmittance of 90% or higher in the visible light band (e.g., 400 to 750 nm wavelength).

In the case of 0-degree incident light, the transmittance 211 of the first reflective coating layer 121 and the transmittance 210 of the second reflective coating layer 123 are close to zero in a wavelength band of approximately 920 nm to 980 nm. Namely, this wavelength band is a cross region (also referred to as a cross band or a cross point) in which high reflective bands of the first and second reflective coating layers 121 and 123 overlap with respect to the 0-degree incident light.

In case of the 30-degree incident light, the transmittance 221 of the first reflective coating layer 121 and the transmittance 220 of the second reflective coating layer 123 are close to zero in a wavelength band of approximately 880 nm to 940 nm. Namely, this wavelength band is a cross region in which the high reflective bands of the first and second reflective coating layers 121 and 123 overlap with respect to the 30-degree incident light.

As described above, the wavelength shift means that the transmittance characteristics of the first and second reflective coating layers 121 and 123 move toward a shorter wavelength when the incident angle moves at a higher angle.

Since the first and second reflective coating layers have a cross region of the high reflective band, the IR light corresponding to the cross region is not absorbed by the film plate and is repeatedly reflected by the first and second reflective coating layers as previously discussed with reference to FIG. 1. Embodiments may prevent this multiple reflection phenomenon and thereby obviate light blurring due to the IR light that enters the image sensor along multiple reflection paths. In addition, embodiments further consider a wavelength shift due to the coating layers so as to prevent the multiple reflection and the light blurring. This will be described later in detail.

Now, an IR cut filter according to an embodiment will be described.

Figure 3:
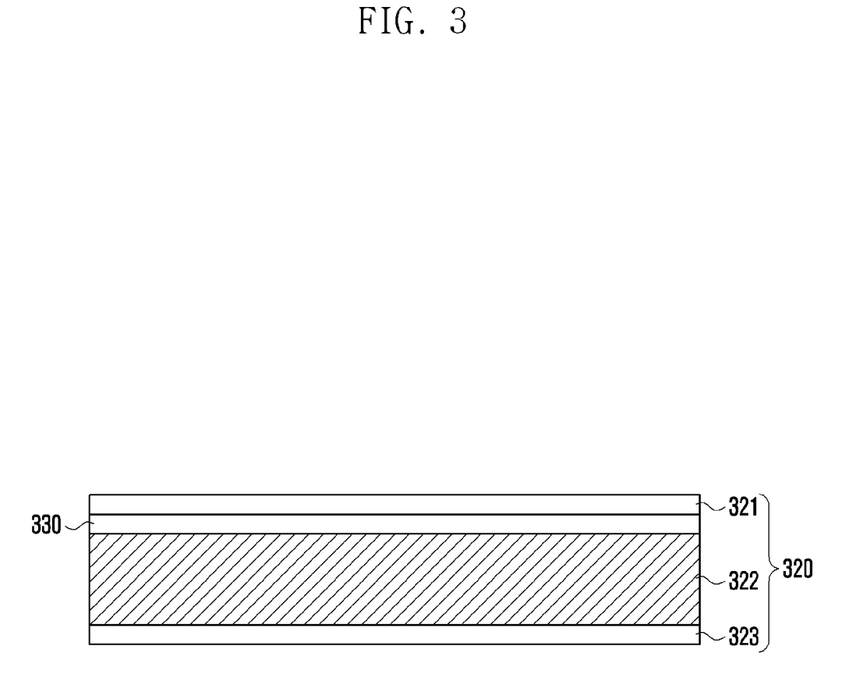
FIG. 3 is a cross-sectional diagram illustrating an IR cut filter according to an embodiment.

FIG. 3 is a cross-sectional diagram illustrating an IR cut filter according to an embodiment.

As shown in FIG. 3, the IR cut filter 320 according to an embodiment includes an absorbing film plate 322 for absorbing IR light, a first coating layer 321 formed on an upper side of the absorbing film plate 322, a second coating layer 323 formed on a lower side of the absorbing film plate 322, and a reflected light absorbing layer 330 formed between the first coating layer 321 and the absorbing film plate 322.

In one example, the absorbing film plate 322 may be an optical plastic substrate (e.g., transparent glass) or formed of a substrate that contains a first absorbent (e.g., $P_2O_5$, CuO, etc.) that absorbs the IR light in a first wavelength band. The absorbing film plate 322 may be formed to have a transmittance of 90% or more with regard to the visible light and to absorb the IR light of the first wavelength band (e.g., 700 nm to 1000 nm). Namely, the light having a wavelength corresponding to the IR band is absorbed by the absorbing film plate 322, and the light having a wavelength corresponding to the other band may pass the absorbing film plate 322 without being absorbed.

In one example, the absorbing film plate 322 may be formed so that the light transmittance in the IR band is 30% or less and the light transmittance in the visible band is 90% or more.

The first coating layer 321 may be formed of an IR reflective coating layer or IR blocking coating layer that transmits (i.e., passes) the visible light and partially reflects (i.e., blocks) the IR light. The first coating layer 321 may be formed of a multilayer thin film in which a layer having a first refractive index and a layer having a second refractive index being different from the first refractive index are alternately deposited.

In one example, the layer having the first refractive index may include at least one material selected from the group consisting of titanium oxide, alumina, zirconium oxide, tantalum pentoxide, niobium oxide, lanthanum oxide, yttrium oxide, zinc oxide, zinc sulfide, and indium oxide, thus having a higher refractive index. The layer having the second refractive index may include at least one material selected from the group consisting of silica ($SiO_2$), lanthanum fluoride, magnesium fluoride, and sodium alumina fluoride, thus having a lower refractive index.

The first coating layer 321 may be formed to have a transmittance of 90% or more in the visible band (e.g., 400 to 700 nm wavelength) and to partially reflect and partially transmit the IR light in the IR band. By adjusting the physical quantities (e.g., material, thickness, number of layers, refractive index, etc.) of the first coating layer 321, the wavelength band for reflecting the IR light may be selected.

The second coating layer 323 may be formed to have a transmittance of 90% or more in the visible band and to reflect the IR light of the remaining band that is not reflected by the first coating layer 321. For example, the second coating layer 323 may be formed of a multilayer thin film in which dielectric layers, e.g., a $TiO_2$ (n=2.30) layer and a $SiO_2$ (n=1.46) layer, are alternately deposited. The second coating layer 323 may be formed of an anti-reflective coating layer which prevents light of a specific wavelength band from being reflected by adjusting the refractive index of the medium at the interface of the multilayered dielectric layers. Each of the first and second coating layers 321 and 323 may be designed in consideration of the range of a reflective or refractive index and/or a desired IR blocking band.

According to one example, the first coating layer 321 and the second coating layer 323 may be formed to have a transmittance of 90% or more with regard to the visible light and to have a reflectance of 99% or more with regard to the IR light having a wavelength of 800 to 1200 nm.

The reflected light absorbing layer 330 may be formed to have a transmittance of 90% or more with regard to the visible light transmitted through the first coating layer 321 and to absorb the IR light of the second wavelength band that is reflected within the absorbing film plate 322 by the first and second coating layers 321 and 323. Namely, the reflected light absorbing layer 330 may be formed to contain a second absorbent that absorbs the IR light in a specific band causing multiple reflection, i.e., in a high reflective cross region of the first and second coating layers 321 and 323, e.g., in a wavelength of 850 nm to 950 nm (or 800 nm to 1000 nm).

In an environment in which a light source having a large amount of IR rays exists, the IR cut filter 320 according to this embodiment allows the reflected light absorbing layer 330 to absorb the IR light of a specific wavelength band that is reflected within the absorbing film plate 322 by the first and second coating layers 321 and 323 without being absorbed by the absorbing film plate 322. Therefore, the IR cut filter 320 can improve the blocking efficiency of IR light.

In this embodiment, the absorbing film plate 322 and the reflected light absorbing layer 330 formed thereon may be collectively referred to as an absorption type filter. Although the reflected light absorbing layer 330 is described as being formed between the absorbing film plate 322 and the first coating layer 321, it may be formed between the absorbing film plate 322 and the second coating layer 323.

Figure 4:
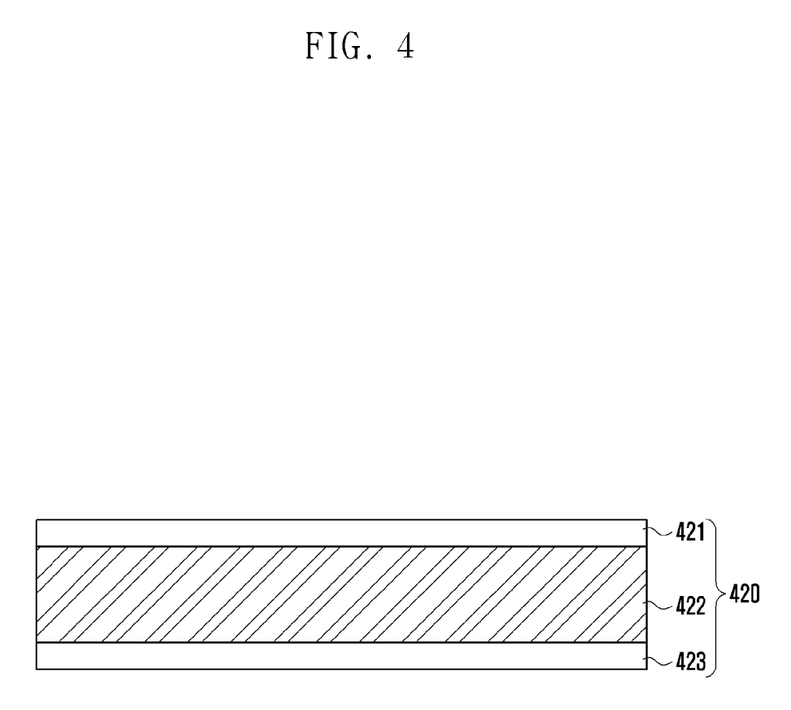
FIG. 4 is a cross-sectional diagram illustrating an IR cut filter according to another embodiment.

FIG. 4 is a cross-sectional diagram illustrating an IR cut filter according to another embodiment.

As shown in FIG. 4, the IR cut filter 420 according to another embodiment includes an absorbing film plate 422, a first coating layer 421 formed on an upper side of the absorbing film plate 422, and a second coating layer 423 formed on a lower side of the absorbing film plate 422.

The absorbing film plate 422 may be formed of an optical substrate (or resin) that contains a first absorbent (e.g., $P_2O_5$, CuO, etc.) for absorbing the IR light of a first wavelength band (e.g., 700 nm to 1000 nm) and a second absorbent for further absorbing the IR light of a second wavelength band. Here, the second absorbent may be an absorbing agent that absorbs the IR light of a specific band that may cause multiple reflections. For example, this specific band, i.e., the second wavelength band, may be the range of 850 nm to 950 nm (or 800 nm to 1000 nm). The absorbing film plate 422 may be formed to have a transmittance of 90% or more with regard to the visible light and to have an absorptance of 90% or more with regard to the IR light in the 700 nm to 900 nm band.

The first coating layer 421 may be formed of an IR reflective coating layer or IR blocking coating layer that transmits (i.e., passes) the visible light and partially reflects (i.e., blocks) the IR light. The first coating layer 421 may be formed of a multilayer thin film in which a layer having a first refractive index and a layer having a second refractive index being different from the first refractive index are alternately deposited. The first coating layer 421 may be formed to have a transmittance of 90% or more in the visible band (e.g., 400 to 700 nm wavelength) and to partially reflect and partially transmit the IR light in the IR band.

The second coating layer 423 may be formed to have a transmittance of 90% or more in the visible band and to reflect the IR light of the remaining band that is not reflected by the first coating layer 421. For example, the second coating layer 423 may be formed of an anti-reflective coating layer which prevents light of a specific wavelength band from being reflected by adjusting the refractive index of the medium at the interface of the multilayered dielectric layers. Each of the first and second coating layers 421 and 423 may be designed in consideration of the range of a reflective or refractive index and/or a desired IR blocking band.

According to one example, the first coating layer 421 and the second coating layer 423 may be formed to have a transmittance of 90% or more with regard to the visible light and to have a reflectance of 99% or more with regard to the IR light having a wavelength of 800 to 1200 nm.

In this embodiment, the absorbing film plate 422 further containing the second absorbent may be referred to as an absorption type filter.

Figure 5:
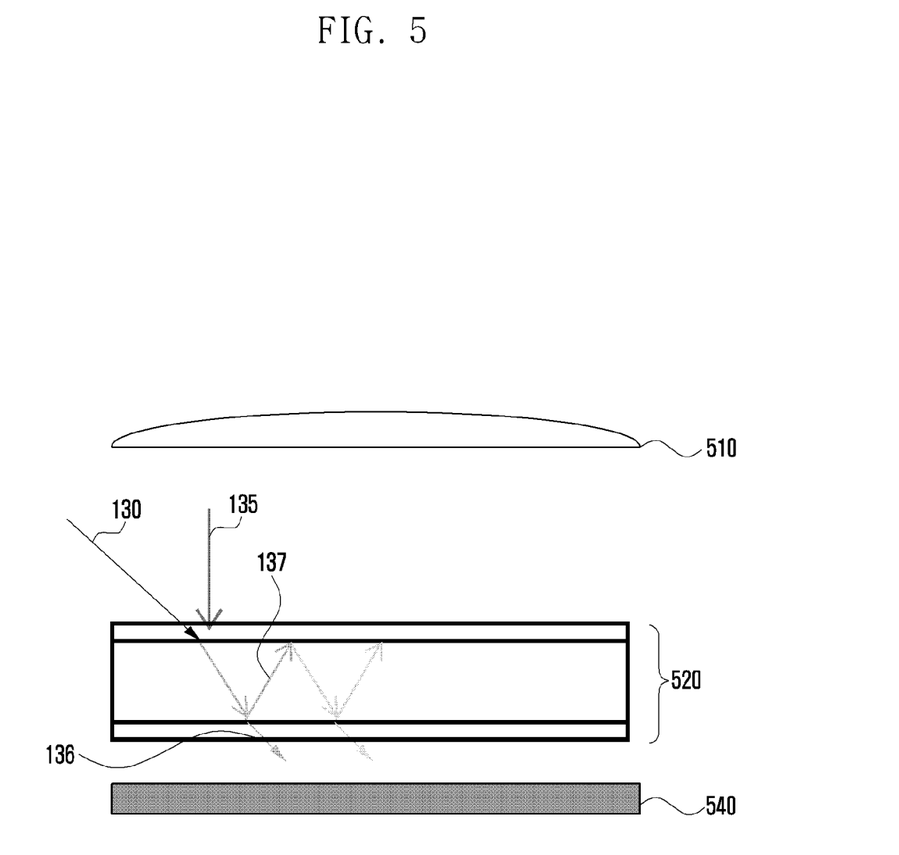
FIG. 5 is a schematic diagram illustrating a light absorption path of an IR cut filter according to an embodiment.

FIG. 5 is a schematic diagram illustrating a light absorption path of an IR cut filter according to an embodiment.

As shown in FIG. 5, the IR cut filter 520 according to an embodiment may be disposed between a lens 510 and an image sensor 540 in a camera module or a digital camera. As described above, the IR cut filter 520 may include the absorbing film plate and coating layers formed on both sides thereof. Additionally, as shown in FIG. 3, the absorbing film plate 322 may have a structure in which the reflected light absorbing layer 330 for absorbing the IR light in the multiple reflection band is formed on the absorbing film plate 322; or, as shown in FIG. 4, the absorbing film plate 422 may have a structure in which the second absorbent for absorbing the IR light in the multiple reflection band is contained in the absorbing film plate 422.

Light incident on the lens 510 passes through the lens 510, passes through the IR cut filter 520, and reaches the image sensor 540. The light incident on the IR cut filter 520 after passing through the lens 510 has an incident angle in the range of 0 degrees to about 30 degrees. The incident angle of the incident light is equal to the incident angle (CRA) of the light incident on the image sensor 540. In FIG. 5, a reference numeral 135 denotes 0-degree incident light, and a reference numeral 130 denotes 30-degree incident light.

When the incident light (e.g., 130 or 135) is incident on the IR cut filter 520, the visible light passes through the IR cut filter 520 and reaches the image sensor 540. In addition, as discussed above, a part of the light in the IR band may be repeatedly reflected by the first and second coating layers (321 and 323 in FIG. 3 or 421 and 423 in FIG. 4) formed on both sides of the IR cut filter 520. However, since the IR cut filter 520 further has the reflected light absorbing layer (330 in FIG. 3) containing the second absorbent or has the second absorbent in the absorbing film plate (422 in FIG. 4), the light reflected by the first and second coating layers may be absorbed.

That is, even if a part of the IR light included in the incident light (e.g., 130 or 135) is introduced into the IR cut filter 520 and is then subjected to multiple reflections due to the cross region of the high reflective band of the first and second coating layers, such IR light is absorbed by the second absorbent for absorbing the IR light in the multiple reflection band. Therefore, the multiple reflections can be suppressed.

Moreover, in the IR cut filter according to various embodiments, the IR absorption band of the second absorbent may be determined by further considering the wavelength shift phenomenon due to the coating layers as described above with reference to FIG. 2. Namely, the wavelength shift band for the angular range from 0 degrees to the maximum incident angle (CRA) of the image sensor 540 is included in the IR absorption band of the second absorbent.

Figure 6:
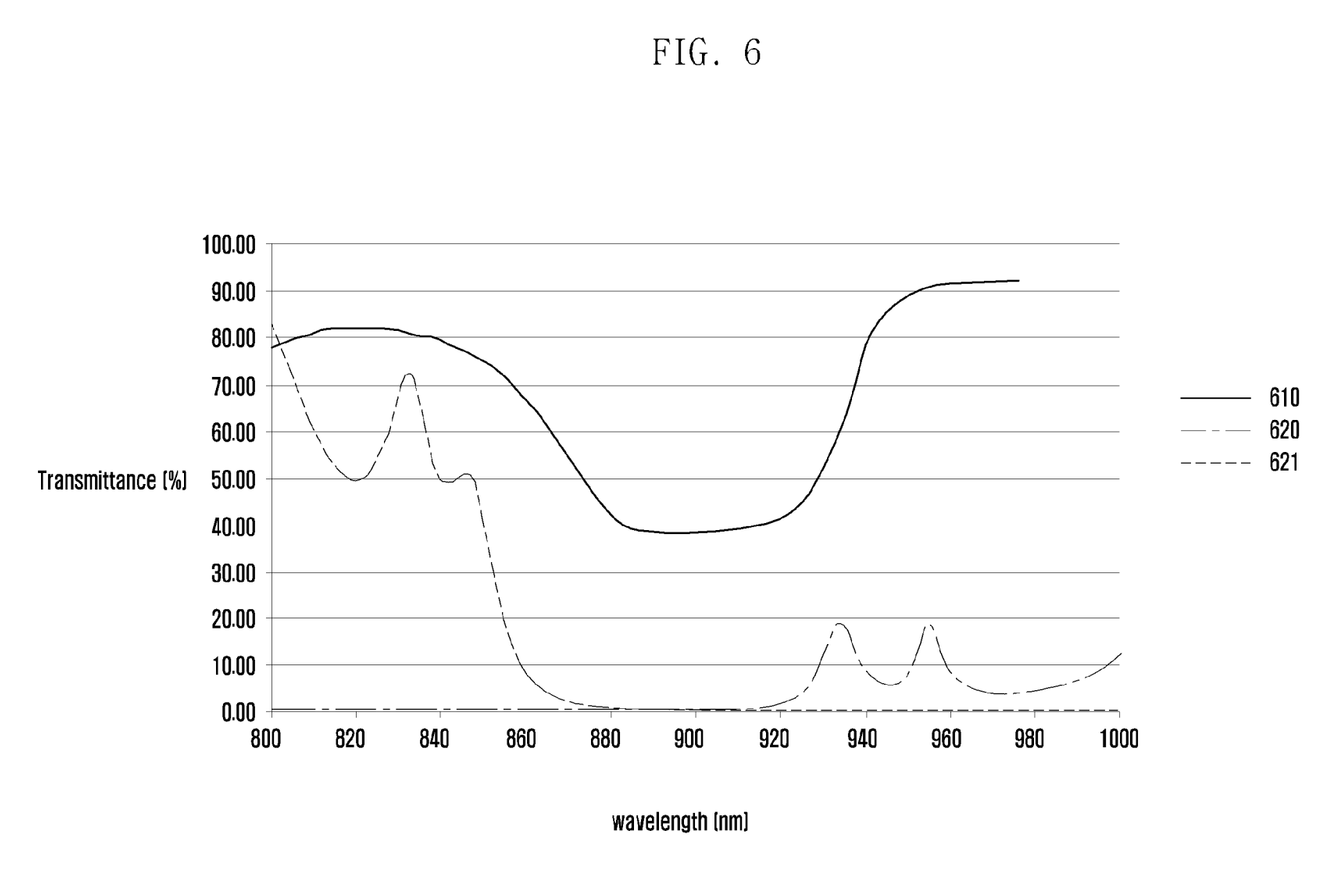
FIG. 6 is a graph illustrating transmittance of IR light in an IR cut filter according to an embodiment.

FIG. 6 is a graph illustrating transmittance of IR light in an IR cut filter according to an embodiment.

In the graph of FIG. 6, the abscissa indicates the IR band having a wavelength from 800 nm to 1000 nm, and the ordinate indicates the transmittance (%). A reference numeral 610 denotes the transmittance of the absorption type filter, a reference numeral 620 denotes the transmittance of the first coating layer, and a reference numeral 621 denotes the transmittance of the second coating layer. As mentioned above, the absorption type filter means the absorbing film plate (322 in FIG. 3) on which the reflected light absorbing layer (330 in FIG. 3) is formed, or the absorbing film plate (422 in FIG. 4) in which the second absorbent is contained.

In the wavelength range of approximately 880 nm to 920 nm, the transmittance of both the first and second coating layers is close to zero. Namely, this range means a cross region in which the high reflective bands of the coating layers overlap with each other. Additionally, it can be seen that the IR transmittance of the absorption type filter is reduced to about 40% in the cross region. Namely, this means that the IR light of the above wavelength range is absorbed by the reflected light absorbing layer or the second absorbent without being transmitted.

Figure 7:
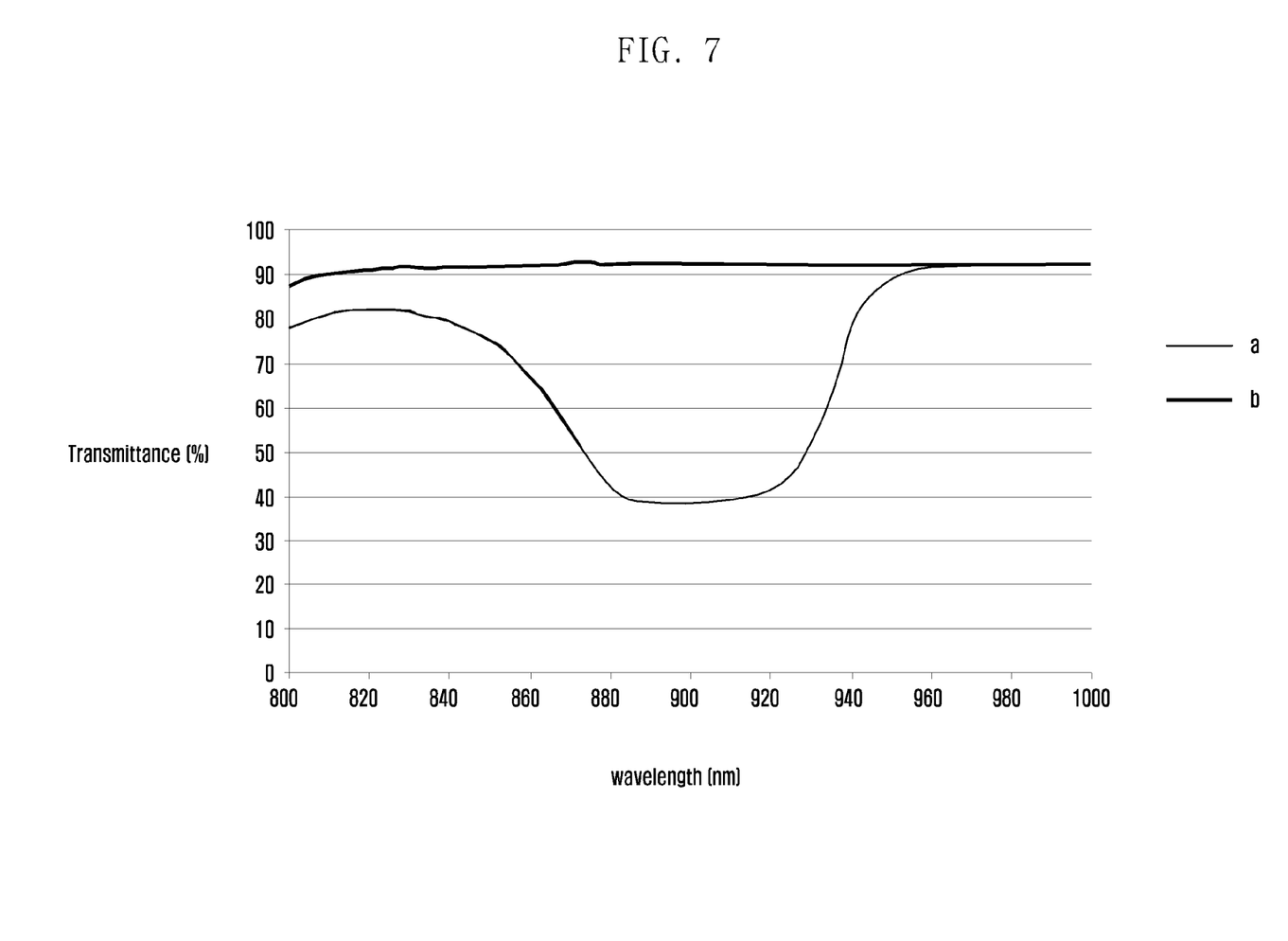
FIG. 7 is a graph illustrating a comparison of transmittance of IR light between an absorption type filter according to an embodiment and a typical film plate.

FIG. 7 is a graph illustrating a comparison of transmittance of IR light between an absorption type filter according to an embodiment and a typical film plate.

In the graph of FIG. 7, a reference character "a" denotes the transmittance of the absorption type filter according to an embodiment, and a reference character "b" denotes the transmittance of a typical film plate (122 in FIG. 1). As mentioned above, the absorption type filter according to an embodiment means the absorbing film plate (322 in FIG. 3)

on which the reflected light absorbing layer (330 in FIG. 3) is formed, or the absorbing film plate (422 in FIG. 4) in which the second absorbent is contained.

The typical film plate has an IR transmittance of about 90% over a wavelength band from 800 nm to 1000 nm. On the other hand, it can be seen that the absorption type filter has a reduced transmittance in a wavelength band of about 850 nm to 950 nm, and in particular, has a transmittance of about 40% in a wavelength band of about 880 nm to 920 nm. Namely, this means that the IR absorption is increased in such a band.

As described heretofore, the IR cut filter according to embodiments is formed so as to absorb the IR light in a multiple reflection band, e.g., in a wavelength band of 850 nm to 950 nm, thereby improving the IR absorption characteristics of the IR cut filter, obviating a light-blurring phenomenon, and acquiring a high-quality image.

The IR cut filter according to embodiments may be provided in an electronic device such as a digital camera or a smart phone. For example, the IR cut filter may be provided in a camera module (e.g., 891 in FIG. 8) of the electronic device (e.g., 800 in FIG. 8).

Figure 8:
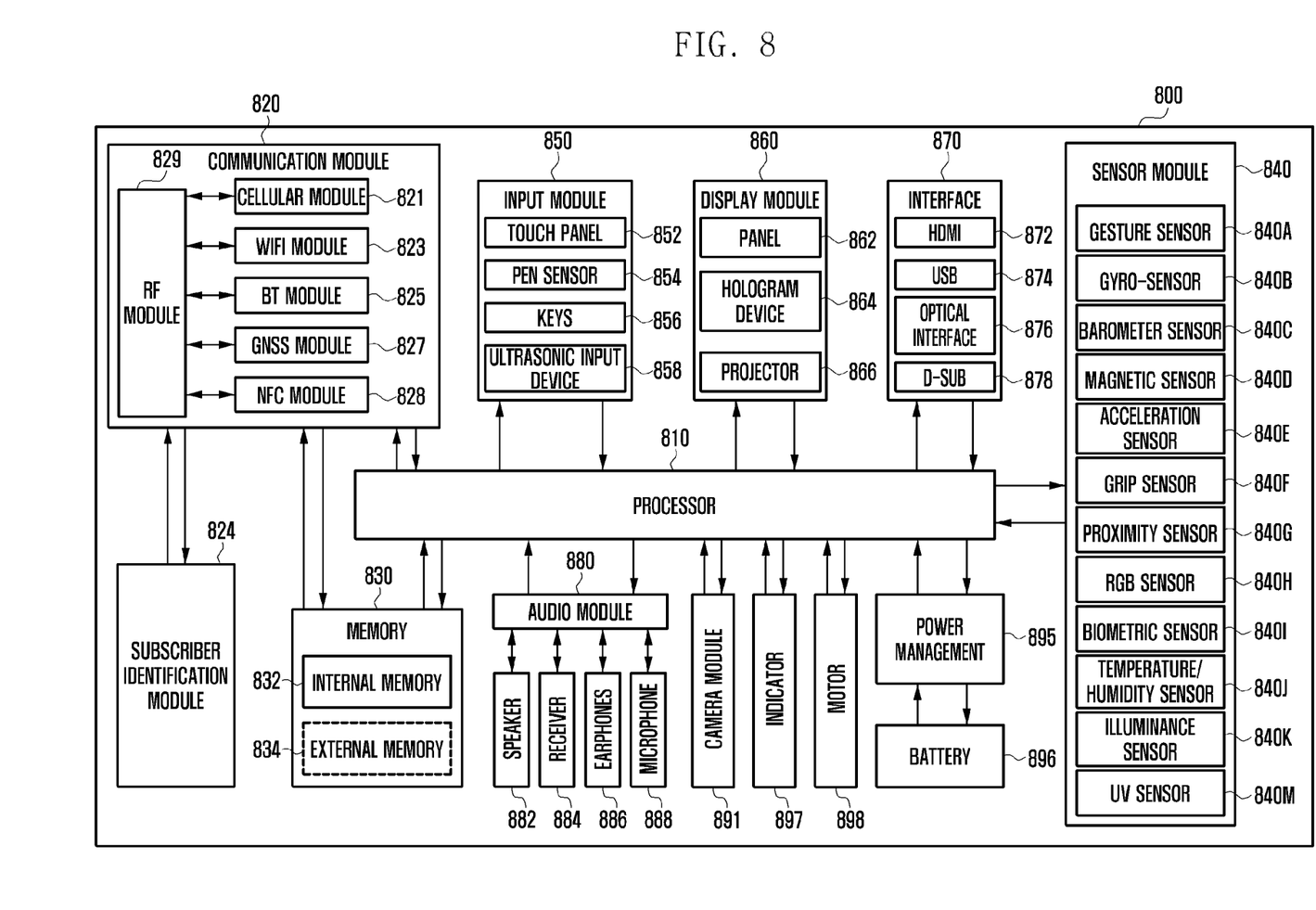
FIG. 8 is a block diagram illustrating an electronic device according to various embodiments.

FIG. 8 is a block diagram of an electronic device 801 according to various embodiments. Referring to FIG. 8, the electronic device 801 may include one or more Application Processors (APs) 810, a communication module 820, a Subscriber Identification Module (SIM) card 824, a memory 830, a sensor module 840, an input device 850, a display 860, an interface 870, an audio module 880, a camera module 891, a power managing module 895, a battery 896, an indicator 897, and a motor 898.

The AP 810 operates an operation system or an application program so as to control a plurality of hardware or software component elements connected to the AP 810 and execute various data processing and calculations including multimedia data. The AP 810 may be implemented by, for example, a System on Chip (SoC). According to an embodiment, the processor 810 may further include a Graphic Processing Unit (GPU).

The communication module 820 (for example, communication interface 160) may transmit/receive data in communication between different electronic devices connected to the electronic device 801 through a network. According to an embodiment, the communication module 820 may include a cellular module 821, a WiFi module 823, a BlueTooth (BT) module 825, a Global Positioning System (GPS) module 827, a Near Field Communication (NFC) module 828, and a Radio Frequency (RF) module 829.

The cellular module 821 may provide a voice, a call, a video call, a Short Message Service (SMS), or an Internet service through a communication network (for example, Long Term Evolution (LTE), LTE-A, Code Division Multiple Access (CDMA), Wideband CDMA (WCDMA), UMTS, WiBro, GSM or the like). Further, the cellular module 821 may distinguish and authenticate electronic devices within a communication network by using a subscriber identification module (for example, the SIM card 824). According to an embodiment, the cellular module 821 may perform at least some of the functions which can be provided by the AP 810. For example, the cellular module 821 may perform at least some of the multimedia control functions.

Each of the WiFi module 823, the BT module 825, the GPS module 827, and the NFC module 828 may include, for example, a process for processing data transmitted/received through the corresponding module. Although the cellular module 821, the WiFi module 823, the BT module 825, the GPS module 827, and the NFC module 828 are illustrated as blocks separated from other in FIG. 8, at least some (for example, two or more) of the cellular module 821, the WiFi module 823, the BT module 825, the GPS module 827, and the NFC module 828 may be included in one Integrated Chip (IC) or one IC package according to one embodiment. For example, at least some (for example, the communication processor corresponding to the cellular module 821 and the WiFi processor corresponding to the WiFi module 823) of the processors corresponding to the cellular module 825, the WiFi module 827, the BT module 828, the GPS module 821, and the NFC module 823 may be implemented by one SoC.

The RF module 829 may transmit/receive data, for example, an RF signal. Although not illustrated, the RF module 829 may include, for example, a transceiver, a Power Amp Module (PAM), a frequency filter, a Low Noise Amplifier (LNA) or the like. Further, the RF module 829 may further include a component for transmitting/receiving electronic waves over a free air space in wireless communication, for example, a conductor, a conducting wire or the like. Although the cellular module 821, the WiFi module 823, the BT module 825, the GPS module 827, and the NFC module 828 share one RF module 829 in FIG. 8, at least one of the cellular module 821, the WiFi module 823, the BT module 825, the GPS module 827, and the NFC module 828 may transmit/receive an RF signal through a separate RF module according to one embodiment.

The SIM card 824 may be a card including a subscriber identification module and may be inserted into a slot formed in a particular portion of the electronic device. The SIM card 824 may include unique identification information (for example, Integrated Circuit Card IDentifier (ICCID)) or subscriber information (for example, International Mobile Subscriber Identity (IMSI).

The memory 830 may include an internal memory 832 or an external memory 834. The internal memory 832 may include, for example, at least one of a volatile memory (for example, a dynamic RAM (DRAM), a static RAM (SRAM), a synchronous dynamic RAM (SDRAM), and the like), and a non-volatile Memory (for example, a one time programmable ROM (OTPROM), a programmable ROM (PROM), an erasable and programmable ROM (EPROM), an electrically erasable and programmable ROM (EEPROM), a mask ROM, a flash ROM, a NAND flash memory, an NOR flash memory, and the like).

According to an embodiment, the internal memory 832 may be a Solid State Drive (SSD). The external memory 834 may further include a flash drive, for example, a Compact Flash (CF), a Secure Digital (SD), a Micro Secure Digital (Micro-SD), a Mini Secure Digital (Mini-SD), an extreme Digital (xD), or a memory stick. The external memory 834 may be functionally connected to the electronic device 801 through various interfaces. According to an embodiment, the electronic device 801 may further include a storage device (or storage medium) such as a hard drive.

The sensor module 840 may measure a physical quantity or detect an operation state of the electronic device 801, and convert the measured or detected information to an electronic signal. The sensor module 840 may include, for example, at least one of a gesture sensor 840A, a gyro sensor 840B, an atmospheric pressure sensor 840C, a magnetic sensor 840D, an acceleration sensor 840E, a grip sensor 840F, a proximity sensor 840G, a color sensor 840H (for example, Red, Green, and Blue (RGB) sensor) 840H, a biometric sensor 840I, a temperature/humidity sensor 840J, an illumination sensor 840K, and a Ultra Violet (UV) sensor 840M. Additionally or alternatively, the sensor module 840 may include, for example, a E-nose sensor (not illustrated), an electromyography (EMG) sensor (not illustrated), an electroencephalogram (EEG) sensor (not illustrated), an electrocardiogram (ECG) sensor (not illustrated), an Infra-Red (IR) sensor (not illustrated), an iris sensor (not illustrated), a fingerprint sensor (not illustrated), and the like. The sensor module 840 may further include a control circuit for controlling one or more sensors included in the sensor module 840.

The input device 850 may include a touch panel 852, a (digital) pen sensor 854, a key 856, or an ultrasonic input device 858. For example, the touch panel 852 may recognize a touch input in at least one type of a capacitive type, a resistive type, an infrared type, and an acoustic wave type. The touch panel 852 may further include a control circuit. In the capacitive type, the touch panel 852 can recognize proximity as well as a direct touch. The touch panel 852 may further include a tactile layer. In this event, the touch panel 852 may provide a tactile reaction to the user.

The (digital) pen sensor 854 may be implemented, for example, using a method identical or similar to a method of receiving a touch input of the user, or using a separate recognition sheet. The key 856 may include, for example, a physical button, an optical key, or a key pad. The ultrasonic input device 858 is a device which can detect an acoustic wave by a microphone (for example, microphone 888) of the electronic device 801 through an input means generating an ultrasonic signal to identify data and can perform wireless recognition. According to an embodiment, the electronic device 801 may receive a user input from an external device (for example, computer or server) connected to the electronic device 801 by using the communication module 820.

The display 860 may include a panel 862, a hologram device 864, or a projector 866. The panel 862 may be, for example, a Liquid Crystal Display (LCD) or an Active Matrix Organic Light Emitting Diode (AM-OLED). The panel 862 may be implemented to be, for example, flexible, transparent, or wearable. The panel 862 may be configured by the touch panel 852 and one module. The hologram device 864 may show a stereoscopic image in the air by using interference of light. The projector 866 may project light on a screen to display an image. For example, the screen may be located inside or outside the electronic device 801. According to an embodiment, the display 860 may further include a control circuit for controlling the panel 862, the hologram device 864, or the projector 866.

The interface 870 may include, for example, a High-Definition Multimedia Interface (HDMI) 872, a Universal Serial Bus (USB) 874, an optical interface 876, or a D-sub-miniature (D-sub) 878. Additionally or alternatively, the interface 890 may include, for example, a Mobile High-definition Link (MHL) interface, a Secure Digital (SD) card/Multi-Media Card (MMC) (not shown), or an Infrared Data Association (IrDA) standard interface.

The audio module 880 may bi-directionally convert a sound and an electronic signal. At least some components of the audio module 880 may be included in, for example, the input/output interface. The audio module 880 may process sound information input or output through, for example, a speaker 882, a receiver 884, an earphone 886, the microphone 888 or the like.

The camera module 891 is a device which can photograph a still image and a video. According to an embodiment, the camera module 891 may include one or more image sensors (for example, a front sensor or a back sensor), an Image Signal Processor (ISP) (not shown) or a flash (not shown) (for example, LED or xenon lamp).

The power managing module 895 may manage power of the electronic device 801. Although not illustrated, the power managing module 895 may include, for example, a Power Management Integrated Circuit (PMIC), a charger Integrated Circuit (IC), or a battery or fuel gauge.

The power managing module 895 may manage power of the electronic device 801. Although not illustrated, the power managing module 895 may include, for example, a Power Management Integrated Circuit (PMIC), a charger Integrated Circuit (IC), or a battery or fuel gauge.

The battery fuel gauge may measure, for example, a remaining quantity of the battery 896, or a voltage, a current, or a temperature during the charging. The battery 896 may store or generate electricity and supply power to the electronic device 801 by using the stored or generated electricity. The battery 896 may include a rechargeable battery or a solar battery.

The indicator 897 may show particular statuses of the electronic device 801 or a part (for example, AP 810) of the hardware, for example, a booting status, a message status, a charging status and the like. The motor 898 may convert an electrical signal to a mechanical vibration.

Although not illustrated, the electronic device 801 may include a processing unit (for example, GPU) for supporting a module TV. The processing unit for supporting the mobile TV may process, for example, media data according to a standard of Digital Multimedia Broadcasting (DMB), Digital Video Broadcasting (DVB), media flow or the like.

Figure 9A:
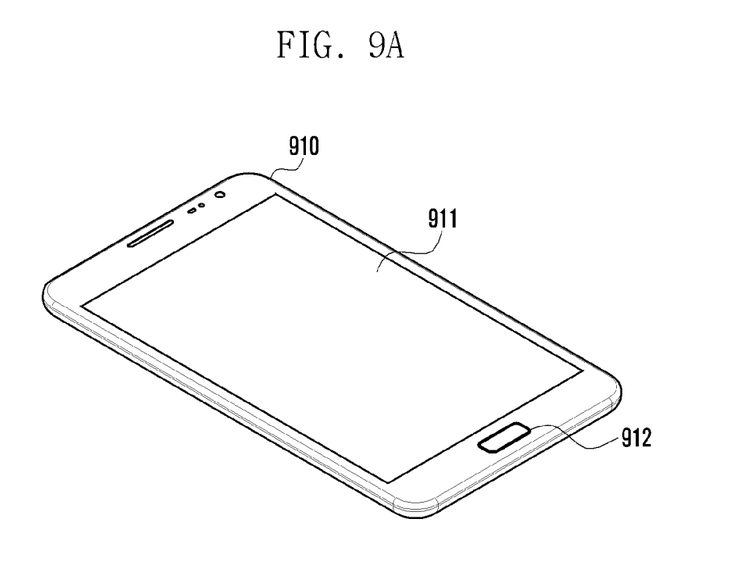
FIGS. 9A and 9B are perspective diagrams illustrating front and rear views of an electronic device according to an embodiment.
Figure 9B:
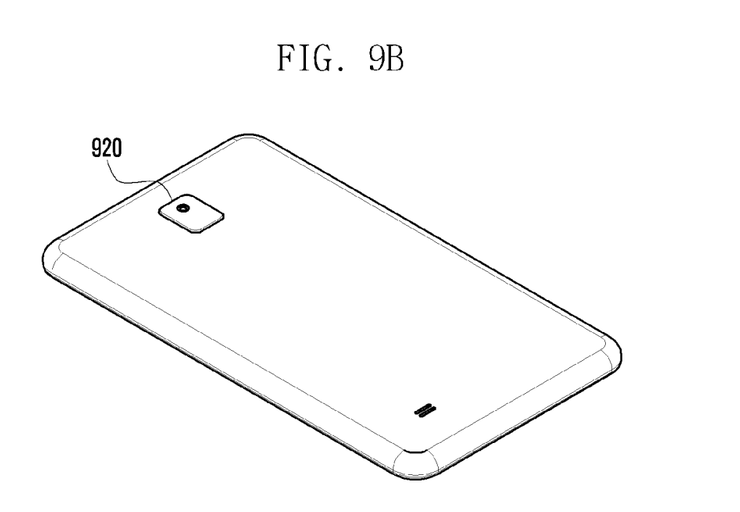

FIGS. 9A and 9B are perspective diagrams illustrating front and rear views of an electronic device according to an embodiment.

The electronic device according to an embodiment may have a camera module and further include an IR cut filter equipped in the camera module as shown in FIG. 3 or 4. FIG. 9A indicates a perspective view of the front side of the electronic device, and FIG. 9B indicates a perspective view of the rear side of the electronic device.

The electronic device may include a housing 910 for forming an internal space for accommodating various components. Also, the electronic device may include a display 911 and a main button 912 which are disposed in the front direction of the electronic device. And also, the electronic device may include a camera module 920 disposed in the rear direction of the electronic device. The housing 910 may include a front surface, a rear surface opposite to the front surface, and a lateral surface connecting the front and rear surfaces. The housing 910 may be formed entirely of a plastic resin material or a conductive material such as a metal. In the internal space formed by the housing 910, various components, such as a battery, a communication module, a driving circuit, a memory, and sensors, for the operation of the electronic device, may be accommodated.

The display 911 may include, for example, a liquid crystal display (LCD), a light emitting diode (LED) display, an organic light emitting diode (OLED) display, a microelectromechanical system (MEMS) display, or an electronic paper display. The display 911 may display various kinds of contents (e.g., text, image, video, icon, symbol, etc.) to a user. The display 911 may include a touch screen to receive a touch, gesture, proximity, or hovering input, for example, using an electronic pen or a part of the user's body.

The electronic device may embed the camera module 920 in the rear direction. The camera module 920 is, for example, a device capable of capturing still images and moving images. According to an embodiment, the camera module 920 may include one or more image sensors (e.g., a front sensor and/or a rear sensor), a lens, an image signal processor (ISP), and/or a flash (e.g., an LED or xenon lamp).

The camera module 920 according to various embodiments may include the IR cut filter as shown in FIG. 3 or 4. For example, the camera module 920 may include a lens for refracting light incident from an outside, an image sensor for obtaining an image formed by the refracted light, and the IR cut filter disposed between the lens and the image sensor. The IR cut filter may include an absorption type filter formed to absorb IR light of a first wavelength band, a first coating layer formed on a first side of the absorption type filter and formed to pass visible light and reflect a part of the IR light, and a second coating layer formed on a second side of the absorption type filter and formed to reflect a remaining part of the IR light that passes through the first coating layer and enters the absorption type filter. The absorption type filter may be formed to further absorb the IR light of a second wavelength band within the absorption type filter.

The term "module" used in this disclosure may refer to a certain unit that includes one of hardware, software, and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (Application-Specific Integrated Circuit) chip, FPGAs (Field-Programmable Gate Arrays), and programmable-logic device, which have been known or are to be developed. At least part of the device (e.g., modules or functions thereof) or method (e.g., operations) according to various embodiments may be implemented as commands stored, e.g., in the form of a program module, in a computer-readable storage medium. In case commands are executed by a processor, the processor may perform a particular function corresponding to those commands. The computer-readable storage medium may be, for example, the memory 130. According to various embodiments, at least a part of the programming module may be implemented in software, firmware, hardware, or a combination of two or more thereof. At least some of the program module may be implemented (e.g., executed) by, for example, the processor. At least some of the program module may include, for example, a module, a program, a routine, a set of instructions, and/or a process for performing one or more functions. The non-transitory computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa. A module or programming module according to various embodiments may include or exclude at least one of the above-discussed components or further include any other component. The operations performed by the module, programming module, or any other component according to various embodiments may be executed sequentially, in parallel, repeatedly, or by a heuristic method. Additionally, some operations may be executed in different orders or omitted, or any other operation may be added.

While the present disclosure has been shown and described in particular with reference to an exemplary embodiment thereof, it will be understood by those skilled in the art that various changes in form and details may be made therein without departing from the scope of the invention as defined by the appended claims.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An infrared (IR) cut filter comprising:
   an absorption layer configured to absorb IR light of a first wavelength band and further absorb reflected IR light of a second wavelength band;
   a first coating layer formed on a first side of the absorption layer and configured to pass visible light and reflect a part of the IR light; and
   a second coating layer formed on a second side of the absorption layer and configured to reflect a remaining part of the IR light that passes through the first coating layer and enters the absorption layer,
   wherein the absorption layer is formed to include a first absorbent for absorbing the IR light of the first wavelength band, and a second absorbent for absorbing the reflected IR light of the second wavelength band,
   wherein the second wavelength band is in a range of about 800 nm to about 1000 nm.

2. The IR cut filter of claim 1, wherein the absorption layer includes:
   an absorbing film plate formed to include the first absorbent; and
   a reflected light absorbing layer formed to include the second absorbent and formed between the absorbing film plate and one of the first and second coating layers.

3. The IR cut filter of claim 1, wherein the first wavelength band is in a range of about 700 nm to about 1000 nm.

4. The IR cut filter of claim 1, wherein the absorption layer has a transmittance of 90% or more with regard to the visible light and contains an absorbent having a higher absorptance for the IR light of the second wavelength band than for the IR light of the first wavelength band.

5. The IR cut filter of claim 1, wherein the first coating layer and the second coating layer are formed to have a transmittance of 90% or more with regard to the visible light and to have a reflectance of 99% or more with regard to the reflected IR light having a wavelength of about 800 nm to about 1000 nm.

6. The IR cut filter of claim 5, wherein the first coating layer and the second coating layer comprise a multilayer thin film in which a layer having a first refractive index and a layer having a second refractive index being different than the first refractive index are alternately deposited.

7. A camera module comprising:
   a lens configured to refract light incident from an exterior of the camera module;
   an image sensor configured to obtain an image formed by the refracted light; and
   an infrared (IR) cut filter disposed between the lens and the image sensor, wherein the IR cut filter comprises:
   an absorption layer configured to absorb IR light of a first wavelength band;
   a first coating layer formed on a first side of the absorption layer and configured to pass visible light and reflect a part of the IR light; and a second coating layer formed on a second side of the absorption layer and configured to reflect a remaining part of the IR light that passes through the first coating layer and enters the absorption layer, and wherein the absorption layer is formed to include a first absorbent for absorbing the IR light of the first wavelength band, and a second absorbent for absorbing the reflected IR light of a second wavelength band, and wherein the second wavelength band is in a range of about 800 nm to about 1000 nm.

8. The camera module of claim 7, wherein the absorption layer comprises:

an absorbing film plate formed to include the first absorbent; and a reflected light absorbing layer formed to include the second absorbent and formed between the absorbing film plate and one of the first and second coating layers.

9. The camera module of claim 7, wherein the first wavelength band is in a range of about 700 nm to about 1200 nm.

10. The camera module of claim 7, wherein the absorption layer has a transmittance of 90% or more with regard to the visible light and contains the second absorbent having a higher absorptance for the IR light of the second wavelength band than for the IR light of the first wavelength band.

11. The camera module of claim 7, wherein the second wavelength band is determined to include a cross region in which reflective bands of the first and second coating layers overlap with each other or a wavelength shift region depending on variation in an incident angle of the IR light.

12. The camera module of claim 11, wherein the absorption layer further comprises a reflected light absorbing layer that is configured to absorb the IR light in a band having a wavelength of about 850 nm to about 950 nm.

13. An electronic device comprising:

a camera module;

a processor; and a memory, wherein the camera module includes an infrared (IR) cut filter configured to absorb IR light of a first wavelength band and to absorb refracted IR light of a second wavelength band that is narrower than the first wavelength band within the infrared cut filter, wherein, the infrared cut filter is formed to include a first absorbent for absorbing the IR light of the first wavelength band, and a second absorbent for absorbing the refracted IR light of the second wavelength ban, and wherein the second wavelength band is in a range of about 800 nm to about 1000 nm.

* * * * *